(12) United States Patent
Rub

(10) Patent No.: US 8,341,340 B2
(45) Date of Patent: Dec. 25, 2012

(54) MULTI-TIER ADDRESS MAPPING IN FLASH MEMORY

(75) Inventor: Bernardo Rub, Sudbury, MA (US)

(73) Assignee: Seagate Technology LLC, Cupertino, CA (US)

( * ) Notice: Subject to any disclaimer, the term of this patent is extended or adjusted under 35 U.S.C. 154(b) by 376 days.

(21) Appl. No.: 12/840,938

(22) Filed: Jul. 21, 2010

(65) Prior Publication Data

US 2012/0023282 A1   Jan. 26, 2012

(51) Int. Cl.
G06F 12/10 (2006.01)
(52) U.S. Cl. .................... 711/103; 711/203; 711/206
(58) Field of Classification Search ............... 711/103, 711/206
See application file for complete search history.

(56) References Cited

U.S. PATENT DOCUMENTS

| | | | |
|---|---|---|---|
| 6,477,612 B1 * | 11/2002 | Wang | .............................. 711/2 |
| 2003/0037037 A1 | 2/2003 | Adams | |
| 2003/0079104 A1 | 4/2003 | Bethard | |
| 2006/0294339 A1 | 12/2006 | Trika | |
| 2008/0034259 A1 | 2/2008 | Ko | |
| 2008/0189490 A1 | 8/2008 | Cheon et al. | |
| 2008/0195797 A1 | 8/2008 | Sherman | |
| 2008/0272807 A1 | 11/2008 | Lowrey | |
| 2008/0320214 A1 | 12/2008 | Ma | |
| 2009/0083478 A1 | 3/2009 | Kunimatsu | |
| 2009/0254572 A1 | 10/2009 | Redlich | |
| 2009/0303783 A1 | 12/2009 | Lowrey | |
| 2009/0313418 A1 | 12/2009 | Ross | |
| 2010/0023682 A1 | 1/2010 | Lee | |
| 2010/0030946 A1 | 2/2010 | Kuno | |
| 2010/0064111 A1 | 3/2010 | Kunimatsu et al. | |
| 2010/0070735 A1 | 3/2010 | Chen et al. | |
| 2010/0125708 A1 * | 5/2010 | Hall et al. | ...................... 711/154 |
| 2011/0022818 A1 * | 1/2011 | Kegel et al. | ................... 711/206 |
| 2011/0283048 A1 * | 11/2011 | Feldman et al. | ............... 711/103 |
| 2012/0166759 A1 * | 6/2012 | Wong | ............................. 711/206 |

* cited by examiner

Primary Examiner — John Lane
(74) Attorney, Agent, or Firm — Hollingsworth Davis, LLC

(57) ABSTRACT

A user data portion of a flash memory arrangement is grouped into a plurality of mapping units. Each of the mapping units includes a user data memory portion and a metadata portion. The mapping units form a plurality of groups that are associated with at least one lower tier of a forward memory map. For each of the groups, a last written mapping unit within the group is determined. The last written mapping unit includes mapping data in the metadata portion that facilitates determining a physical address of other mapping units within the group. A top tier of the forward memory map is formed that includes at least physical memory locations of the last written mapping units of each of the groups. A physical address of a targeted memory is determined using the top tier and the metadata of the at least one lower tier.

20 Claims, 8 Drawing Sheets

MULTI-TIER ADDRESS MAPPING IN FLASH MEMORY

SUMMARY

Various embodiments of the present invention are generally directed to a method and system for mapping addresses in a solid state non-volatile memory device. In one embodiment, methods, systems, and/or apparatuses perform grouping of a user data portion of a flash memory arrangement into a plurality of mapping units. Each of the mapping units includes a user data memory portion and a metadata portion. The mapping units are formed into a plurality of groups that are associated with at least one lower tier of a forward memory map. For each of the groups, a last written mapping unit within the group is determined. The last written mapping unit includes mapping data in the metadata portion that facilitates determining a physical address of other mapping units within the group. A top tier of the forward memory map is formed that includes at least physical memory locations of the last written mapping units of each of the groups. A physical address of a targeted memory is determined using the top tier and the metadata of the at least one lower tier.

In one configuration, the physical addresses of the mapping units may be arbitrarily assigned to corresponding logical addresses used by a host to access the user data memory portions of the mapping units. In another configuration, determining a physical address of the targeted memory using the top tier and the metadata of the at least one lower tier may involve selecting a first last written memory unit from a selected one of groups based on a logical address of the targeted memory, and determining the physical address of the targeted memory based on the metadata portion of the first last written memory unit. In one arrangement, the mapping data of the last written mapping units do not include the physical addresses of the respective last written mapping units.

In other configurations, the at least one lower tier may include a second tier and a third tier, and in such a case the groups are associated with the second tier. Also in such a case, each of the groups may include a plurality of subgroups, and wherein the subgroups are associated with the third tier. Further in these other configurations, determining the physical address of the targeted memory using the top tier and the metadata of the at least one lower tier may involve: a) selecting a first last written memory unit from a selected one of groups based on a logical address of the targeted memory; b) determining a second last written memory unit of a selected one of the subgroups based on the metadata portion of the first last written memory unit; and c) determining the physical address of the targeted memory based on the metadata portion of the second last written memory unit.

In one embodiment, methods, systems, and/or apparatuses perform receiving, at a flash memory device, an access request for user data based a logical memory address. From a top tier of a forward map based on the logical memory address, a physical address of a last written mapping unit of a lower tier group of the forward map is determined. The lower tier group includes a plurality of mapping units, including the last written mapping unit, and the mapping units each include a user data memory portion and a metadata portion. From lower tier mapping data within the metadata portion of the last written mapping unit, a second physical address of a mapping unit of the lower tier group is determined, and access to the user data is facilitated based on the second physical address.

In one configuration, the physical addresses of the mapping units may be arbitrarily assigned to the corresponding logical addresses. In another configuration, the access request may include a write request. In such a case, a new mapping unit of the lower tier group is selected for receiving user data of the write request, the lower tier mapping data is updated based on a physical address of the new mapping unit, the user data and the mapping data are written to the respective user data memory portion and metadata portion of the new mapping unit, and the top tier is updated with a physical address of the new mapping unit.

In other arrangements, the determining of the second physical address from the lower tier mapping data of the last written mapping unit only occurs if the last written mapping unit does not correspond to the logical memory address, and if the last written mapping unit corresponds to the logical memory address, providing physical address of the last written mapping unit as the second physical address to facilitate access to the user data.

In another configuration, the lower tier mapping data includes second tier mapping data. In such a case, facilitating access to the user data based on the second physical address involves a) determining, from the second tier mapping data, a physical address of a second last written mapping unit of a third tier group of the forward map, wherein the third tier group comprises a subset of the lower tier group; b) determining, from third tier mapping data within the metadata portion of the second last written mapping unit, a third physical address of a mapping unit of the third tier group; and c) facilitating access to the user data based on the third physical address.

These and other features and aspects of various embodiments of the present invention can be understood in view of the following detailed discussion and the accompanying drawings.

DETAILED DESCRIPTION

Figure 1:
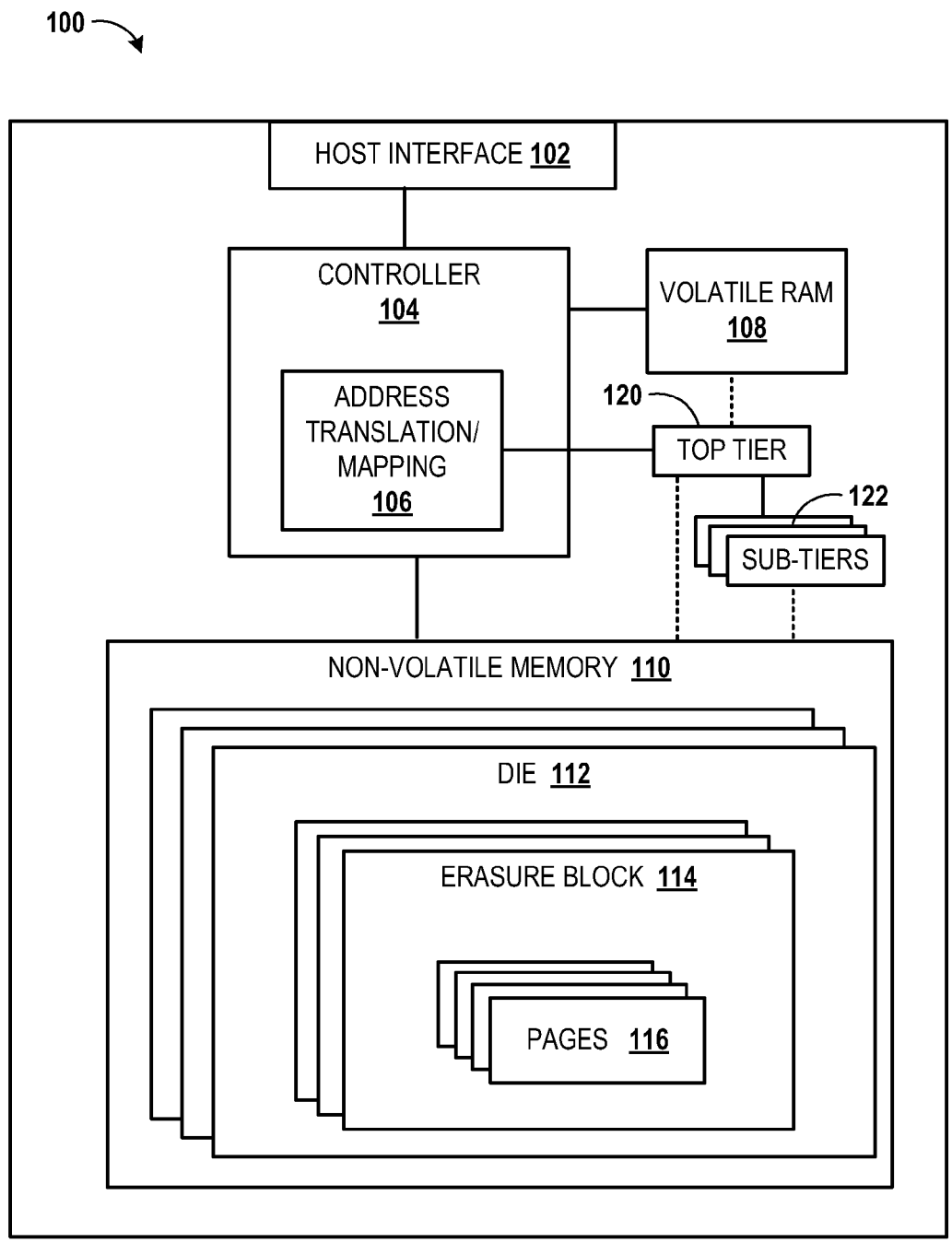
FIG. 1 is a block diagram of a storage apparatus according to an example embodiment of the invention.

The present disclosure relates to mapping of memory units in a solid state memory device for use by a host device. The mapping may be used for purposes of finding physical addresses of data based on a logical address used by a host device to access the data. The memory device may generally maintain a top-tier mapping that includes references to lower tier mapping units. The lower tier mapping units may include additional mapping data that is stored together with user data of a user data portion of non-volatile memory. This additional mapping data facilitates locating the targeted memory units, and may be arranged as multiple tiers within the non-volatile user memory.

Non-volatile memory generally refers to a data storage that that retains data upon loss of power. Non-volatile data storage devices come in a variety of forms and serve a variety of purposes. These devices may be broken down into two general categories: solid state and non-solid state storage devices. Non-solid state data storage devices include devices with moving parts, such as hard disk drives, optical drives and disks, floppy disks, and tape drives. These storage devices may move one or more media surfaces and/or an associated data head relative to one another in order to read a stream of bits. The following discussion is directed to solid-state, non-volatile memory embodiments. These embodiments are provided for purposes of illustration and not of limitation, and concepts may be applicable to other types of data storage that has similar characteristics to solid-state, non-volatile memory devices.

Solid-state storage devices differ from non-solid state devices in that they typically have no moving parts. Solid-state storage devices may be used for primary storage of data for a computing device, such as an embedded device, mobile device, personal computer, workstation computer, or server computer. Solid-state drives may also be put to other uses, such as removable storage (e.g., thumb drives) and for storing a basic input/output system (BIOS) that prepares a computer for booting an operating system.

Flash memory is one example of a solid-state storage media. Flash memory, e.g., NAND or NOR flash memory, generally includes cells similar to a metal-oxide semiconductor (MOS) field-effect transistor (FET), e.g., having a gate (control gate), a drain, and a source. In addition, the cell includes a "floating gate." When a voltage is applied between the gate and the source, the voltage difference between the gate and the source creates an electric field, thereby allowing electrons to flow between the drain and the source in the conductive channel created by the electric field. When strong enough, the electric field may force electrons flowing in the channel onto the floating gate.

Solid state memory may be distinguished from magnetic media in how data is rewritten. In a magnetic media such as a disk drive, each unit of data (e.g., byte, word) may be arbitrarily overwritten by changing a magnetic polarity of a write head as it passes over the media. In contrast, flash memory cells must first be erased by applying a relatively high voltage to the cells before being written, or "programmed." For a number of reasons, these erasures are often performed on blocks of data (also referred to herein as "erase units") that are larger than the data storage units (e.g., pages) that may be individually read or programmed. Therefore, when data of an existing page needs to be changed, it may be inefficient to erase and rewrite the entire block in which the page resides, because other data within the block may not have changed. Instead, it may be more efficient to write the changes to empty pages in a new physical location, remap the logical to physical mapping via the FTL, and mark the old physical locations as invalid/stale.

Because of these and other characteristics, a flash drive controller may need to frequently change the mapping between physical and logical addresses. Such mapping may be used to facilitate quick access to arbitrary blocks of data, as well as ensuring the data can be recovered in case of power loss. An apparatus, method, and computer-readable medium according to embodiments of the invention facilitate achieving these and other goals in a solid-state storage device using a multiple-tiered mapping of addresses.

In reference now to FIG. 1, a block diagram illustrates an apparatus 100 which may incorporate concepts of the present invention. The apparatus 100 may include any manner of persistent storage device, including a solid-state drive (SSD), thumb drive, memory card, embedded device storage, etc. A host interface 102 may facilitate communications between the apparatus 100 and other devices, e.g., a computer. For example, the apparatus 100 may be configured as an SSD, in which case the interface 102 may be compatible with standard hard drive data interfaces, such as Serial Advanced Technology Attachment (SATA), Small Computer System Interface (SCSI), Integrated Device Electronics (IDE), etc.

The apparatus 100 includes one or more controllers 104, which may include general- or special-purpose processors that perform operations of the apparatus. The controller 104 may include any combination of microprocessors, digital signal processor (DSPs), application specific integrated circuits (ASICs), field programmable gate arrays (FPGAs), or other equivalent integrated or discrete logic circuitry suitable for performing the various functions described herein. Among the functions provided by the controller 104 are that of address mapping and/or translation, which is represented here by functional module 106. The module 106 may be implemented using any combination of hardware, software, and firmware. The controller 104 may use volatile random-access memory (RAM) 108 during operations. The RAM 108 may be used, among other things, to cache data read from or written to non-volatile memory 110, map logical to physical addresses, and store other operational data used by the controller 104 and other components of the apparatus 100.

The non-volatile memory 110 includes the circuitry used to persistently store both user data and other data managed internally by apparatus 100. The non-volatile memory 110 may include one or more flash dies 112, which individually contain a portion of the total storage capacity of the apparatus 100. The dies 112 may be stacked to lower costs. The memory contained within individual dies 112 may be further partitioned into blocks, here annotated as erasure blocks/units 114. The erasure blocks 114 represent the smallest individually erasable portions of memory 110. The erasure blocks 114 in turn include a number of pages 116 that represent the smallest portion of data that can be individually programmed or read. In a NAND configuration, for example, the page sizes may range from 512 bytes to 4 kilobytes (KB), and the erasure block sizes may range from 16 KB to 512 KB. It will be appreciated that the present invention is independent of any particular size of the pages 116 and blocks 114, and the concepts described herein may be equally applicable to smaller or larger data unit sizes.

The controller 104, e.g., via the mapping module 106, may also maintain mappings of logical block addresses (LBAs) to physical addresses in the volatile RAM 108, as these mappings may, in some cases, may be subject to frequent changes based on a current level of write activity. In one embodiment, the mapping module 106 uses a multi-level tiered mapping of addresses for performing forward address translations between the host interface 102 and non-volatile memory 110. In the present disclosure, the term "forward mapping" or "forward address translation" generally refers to the determining of one or more physical address of the non-volatile memory 110 based on one or more logical addresses, e.g., used for access via host interface 102. This is in contrast to reverse mapping, which involves determining one or more logical addresses based on a physical address. While some of concepts discussed herein may be applicable to both forward and reverse mapping, the discussion primarily focuses on forward mapping.

In multi-tiered mapping according to one embodiment of the invention, a first (or top-level) tier 120 of information is directly maintained and/or accessed by the mapping module 106. This top-level tier may be maintained in any combination of RAM 108 and a system portion (not shown) of non-volatile memory 110. For example, the non-volatile memory 100 may include a portion reserved for system memory (e.g., non-user memory). The system memory portion may include solid state memory (e.g., SLC flash memory) having an estimated life that is orders of magnitude higher than other portions (e.g., MLC flash memory) of the non-volatile memory 110.

Generally, the mapping module 106 maintains a forward map that addresses only the last memory unit written for each group of N memory units The last memory unit to be written contains pointers to (e.g., physical addresses of) all other memory units in the group. If the memory being targeted for a write or read is not the last in the group to be written (e.g., the one the forward map points to) then an additional flash read is used to get the physical address of the targeted memory.

For example, the forward map as described above may include the top tier 120. Each address of the top-level tier 120 may be used to access a particular group of addresses of one or more lower or sub-tiers 122. The lower tier data 122 is part of a user portion of the non-volatile memory 110. Additional mapping information is stored with the user data in these lower tiers 122, and this additional data allows particular pages 116 (or other individually addressable areas of memory) within the group to be addressed. By using the user memory to store the mapping information of the lower tiers 122, the mapping information may be continually kept up to date.

In one embodiment, the top tier 120 may include references to what are referred to herein as "mapping units." The mapping units may include user data, and may be considered memory units/blocks primarily used for storing user data. The mapping units may also include data structures and/or physical data blocks that contain the mapping information for all of the other members of the same group of mapping units at a particular tier level. For example, the top tier 120 may include a reference (e.g., address) to a plurality of mapping units of a second tier of the lower tiers 122. Each reference of the top tier 120 points to one address of a group of units in the second tier, e.g., an address of a unit within that lower tier group that was last written/programmed. That group of memory units is associated with the particular address, and data contained within the addressed memory unit can be read to locate the final destination unit within the group.

This referencing of addresses can be extended in the same way to additional tiers within the lower tiers 122. For example, the top tier may point to an address of a mapping unit within a second-level tier group (e.g., directly below top tier 120). The second-level tier mapping unit may include references to subgroups within the second-level tier group, e.g., a third-level tier subgroup. These references in the second-level tier point to an address within the third-level tier subgroup, e.g., a mapping unit within the third tier subgroup that was last written. This third-level tier mapping unit contains mapping data to used locate the final targeted memory unit within the third-level tier. This can be extended to additional tier levels, if desired.

In the mapping schemes embodiments described herein, there need be no predetermined correlation between groups of logical addresses and groups of physical addresses, e.g., assignments of physical to logical blocks may be arbitrary. For example, a block/range of logical addresses need not map to a corresponding block/range of physical addresses, and vice versa. While there may be cases where this occurs naturally or by design (e.g., large contiguous files subject to sequential read/writes) the forward and reverse mappings may in general be formed independently of any association between groupings of physical and logical addresses.

Figure 2:
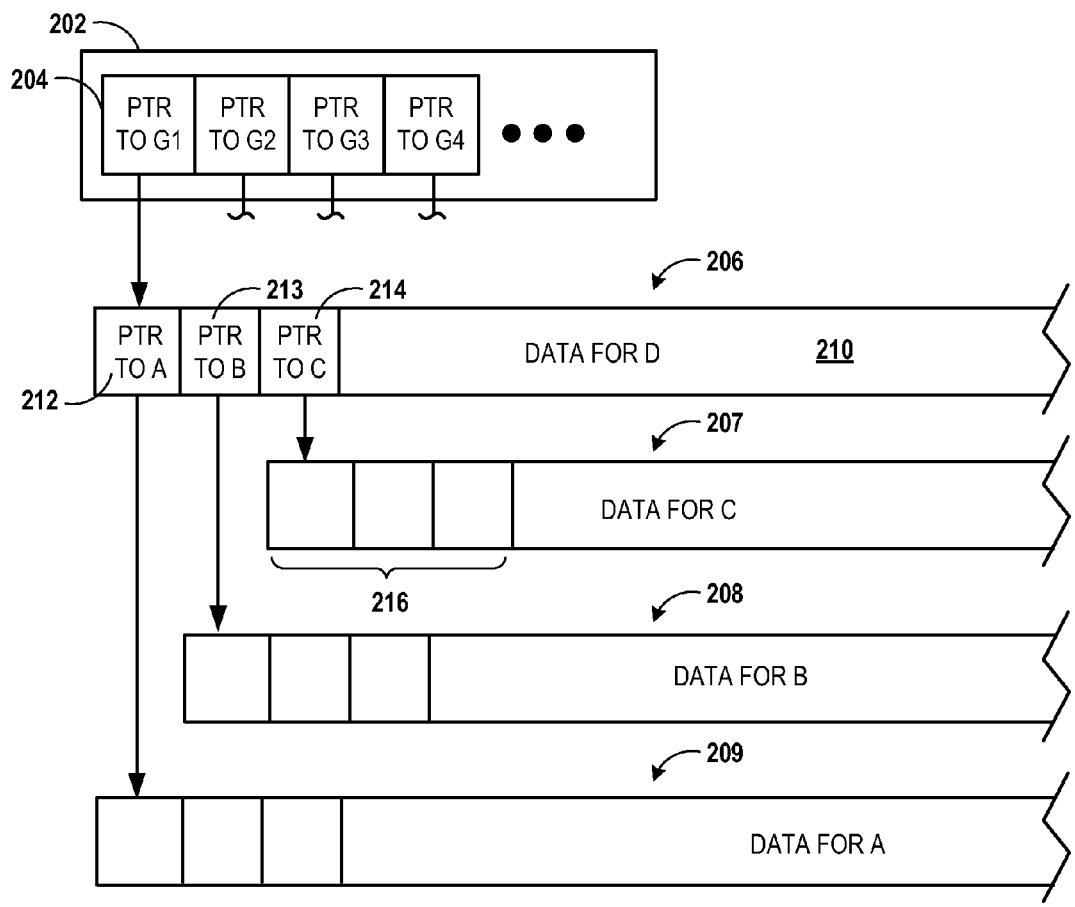
FIG. 2 is a block diagram illustrating a two-tier memory mapping according to an example embodiment of the invention.

In reference now to FIG. 2, a block diagram illustrates a two-tiered mapping scheme according to an embodiment of the invention. A top-level tier 202 of a forward map includes a number of references to mapping units, as represented by pointer data 204. In the discussion that follows, the term "N-level" mapping refers to the size of the group pointed to by the pointers of a particular tier. In FIG. 2, the N=4, and so the pointer 204 is used to access at least one of a group of four mapping units, 206-209.

At least one member of the group 206-209 includes data that facilitates accessing the others of the group 206-209. In this example, the pointer 204 references mapping unit 206, which may have been the last mapping unit of the group 206-209 to have data written to it. Mapping unit 206 includes data portion 210 where the user data is stored. The mapping unit 206 also has mapping data (also referred to herein as metadata), represented here as pointers 212-214. The pointers 212-214 reference the remaining members 207-209 of the group 206-209. There may be no need for mapping unit 206 to store a reference to itself, and so in general each mapping unit may only need to store N−1 references/pointers.

The remaining data members 207-209 also include sections usable for storing mapping data, e.g., section 216 of memory unit 207. Those data regions 216 may have been used for that purpose at the time the respective mapping unit 207 was written to, but the data in region 216 would be considered invalid/stale because mapping unit 206 contains the most recent mapping data. If and when the user data in 207 is updated, then this would generally involve writing the data to a new memory unit (not shown), because it may be inefficient to erase and then rewrite at the current address of unit 207. In such a case the mapping data currently stored in 212-214 would be updated and written to the mapping data section of the newly written mapping unit. Also in such a case, pointer 204 is updated to point to the recently written mapping unit. Thereafter, the mapping data in sections 212-214 would be considered stale/invalid.

By distributing the mapping information within user memory (e.g., memory units 206-209), the size of the top-level tier 202 of the forward map may be significantly reduced, e.g., by a factor of N. In a two tier map, enough memory may need to be reserved for N copies of the second level map, because each mapping unit needs to reserve space to address the other group members in case that mapping unit is the last written memory unit for that group. This may somewhat reduce the amount of user memory available, because each memory unit may need to reserve enough space to address N−1 other memory units within the group. For example, with N=8, and assuming 4-byte addresses are used to address 4 KB memory units, the overhead is 7*4=28 bytes, which is about 0.7% overhead (28 B/4 KB). This is offset by the significant reduction in the size of the forward map. For N=8, the size of the forward map is reduced by a factor of 8.

When using a multi-tier mapping, read or write operations may need to be preceded by a flash read of the second level (and/or higher level) mapping data. As a result, a system designer may need to make additional provisions to ensure performance is not significantly impacted. For example, performance impacts can be mitigated by maintaining some or all of the forward map in RAM (e.g., caching). Further, performance impact may be much lower for sequential transfers, as will be described in greater detail hereinbelow.

Even given the above considerations, use of a multi-tier map may have a number of benefits. The size of the forward map may be significantly reduced (by a factor of N for a group size of N). Further, the lower tier mapping data on flash is always current, and so additional flash updates are not required to backup the map since all the lower tier map updates are written along with the data. Because a portion of the map is written with the data, there may be no need to log mapping update in order to periodically update the forward map in flash.

Figure 3:
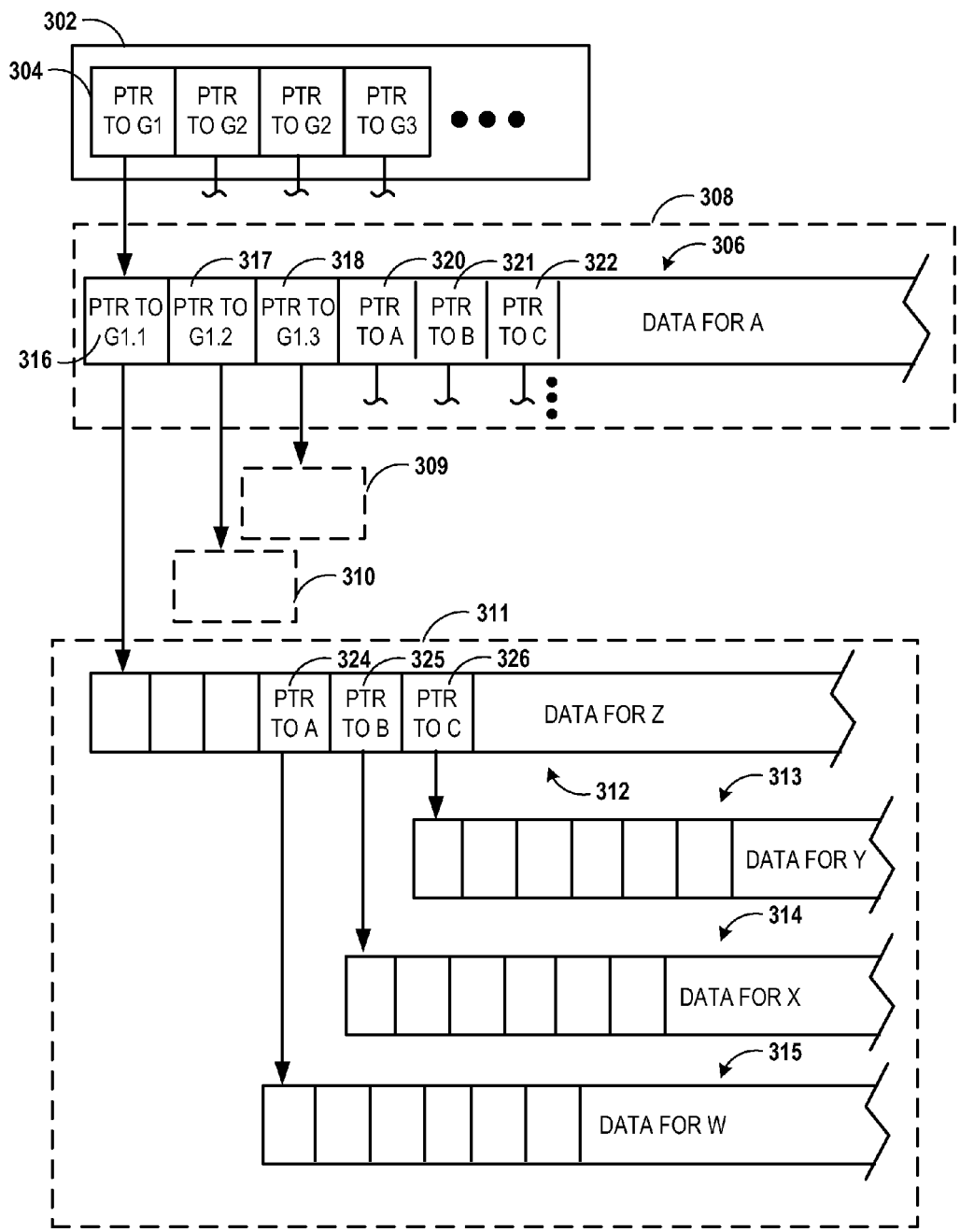
FIG. 3 is a block diagram illustrating a three-tier memory mapping according to an example embodiment of the invention.

In reference now to FIG. 3, a block diagram illustrates a three-tiered mapping scheme according to an embodiment of the invention. In this example, the mapping dimension may be represented as N*M, where N=M=4 in the illustrated example. One of ordinary skill in the art will be readily able to extend the concepts shown in FIG. 3 to additional mapping dimensions (e.g., N*M*P), and/or to adapt the example to cases where N does not equal M.

A top-level tier 302 of a forward map includes a number of references to mapping units, as represented by pointer data 304. In this example, the pointer data 304 references a mapping unit 306, which is the last mapping unit written in all the lower tier mapping units associated with pointer 304. In the illustrated example, the second tier (immediately below the top tier 302) is represented as N-groups 308-311. Within each of the N-groups 308-311 are M-mapping units, such as mapping units 312-315 shown in group 311.

In this case, the referenced mapping unit 306 contains a first portion of metadata, e.g., metadata portions 316-318, that contains only part of the path to the targeted memory address. Thus, when pointer 304 accesses the last memory unit written in groups 308-311 (which is memory unit 306), one of N−1 sub-group pointers 316-318 in that memory unit 306 are next referenced, unless the targeted memory is already within group 308. If the targeted memory is within group 308, there is no need to read the data in 316-318. However, a third-tier pointer 320-322 within memory unit 306 may be then read to address the ultimate target within group 308. If memory unit 306 is the target, then this second read is also unnecessary.

If the targeted memory unit is not within group 308, then one of pointers 316-318 may lead to another group, e.g., group 311. Mapping unit 312 is the last written unit of the M memory units in group 311, and so one of pointers 324-326 may then be accessed to locate the targeted unit 312-315 within the group 311. As with the two-level tier in FIG. 2, if the targeted unit 312-315 is being written to, then a new memory unit receives the data, and this new memory unit stores mapping data for both tiers. This newly written mapping data includes mapping data for memory units within groups 308-311 as well as mapping data for use within group 311. In such a case, the higher level mapping data 316-318 of mapping unit 306 may be invalid/stale. However, the lower level mapping data 320-322 may still be valid, because mapping unit 306 may still be the last written memory unit within group 308.

The mapping approach described here can be extended to multiple levels to reduce the RAM requirements at the expense of additional overhead and additional flash reads. For example, the lower tier mapping data 122 in FIG. 1 can be considered a K-dimensional map. In such a case, a one dimensional map (K=1) with N=8 requires at most 28 B per mapping unit, one extra read to flash, but only needs a 0.0125% capacity RAM table (assuming the full forward map consumes 0.1% of total storage capacity). A two dimensional map, M×N=8×8, requires at most 56 B per mapping unit, two extra reads, but only needs a 0.0015% capacity RAM table.

More generally, a grouping of mapping units can be defined such that each item in the group can be referenced by a K-dimensional coordinate. For example, a group of size N=16 can be represented in two dimensions as a 4×4 array. In the K-dimensional space, each group member (e.g., memory storage unit) is identified by a coordinate $(x_1, x_2, \ldots x_K)$. As with the single level addressing, every memory unit in the group has a corresponding physical address. With single level addressing, each unit of data written has the address of each group member embedded with the data. With multi-level addressing, only part of the addresses are included with each unit of data and up to K reads may be required to locate the physical address of any particular group member.

Figure 4A:
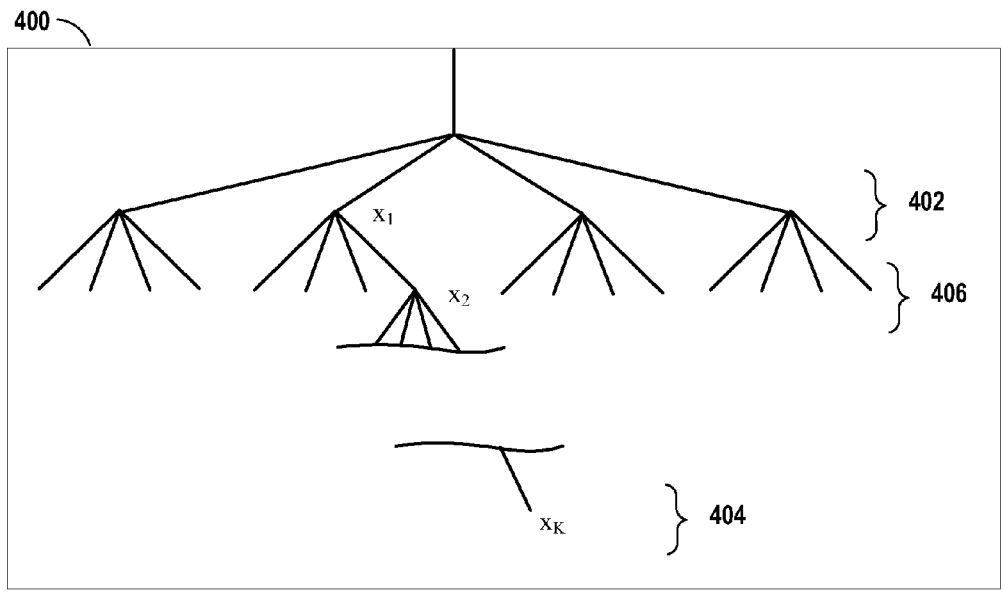
FIG. 4A is a graph illustrating a generalized multi-tier mapping data organization according to an example embodiment of the invention.

The mapping units in a multi-level mapping arrangement can be represented as leaves on a tree with each level of branches represented by one of the K coordinates. This is shown by way of example in graph 400 of FIG. 4A. In this representation, the coordinates specify a particular path through the tree. The meta-data stored with the data for any particular leaf is determined by the path to that leaf, e.g., at level 404. There are K lists of addresses, one for each dimension. The first list 402 contains the physical address for the latest memory unit with each value of the first coordinate. A second set of lists 406 contains the physical address for the latest memory unit with each value of the second coordinate. Similarly, the kth list 404 contains the physical address for the latest mapping units with each value of the kth coordinate that also shares the first k−1 branches.

Figure 4B:
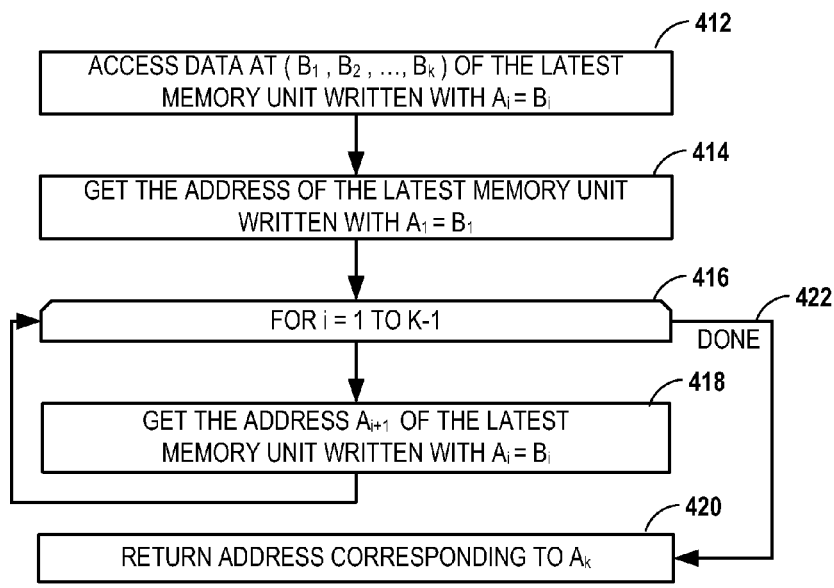
FIG. 4B is a flowchart illustrating a generalized multi-tier mapping procedure according to an example embodiment of the invention.

To locate any mapping units within the group, the latest mapping units written always provides the address of the latest mapping units written with the same first coordinate as the mapping units of interest. Then the latest mapping units with the matching first branch is read to find the address of the latest mapping units with matching first and second branches, and so on. No more than K reads are needed to match the entire path and obtain the physical address of interest. This is shown in FIG. 4B which is a flowchart showing an example subroutine according to an embodiment of the invention.

In the illustrated procedure, a request 412 is received to access desired memory at coordinate $(b_1, b_2, \ldots, b_K)$, where the coordinate of the latest memory units written is $(a_1, a_2, \ldots, a_K)$. The address of the latest, top-level memory unit written with a1=b1 is obtained 414, e.g., from a top-level, forward map. A loop 416 iterates for each of the dimensions 1 to K−1. In the loop, the address $a_{i+1}$ is read 418 from the latest memory unit with $a_i=b_i$. However, if the address $a_{i+1}$ corresponds to latest memory unit with $a_i=b_i$, then that address can be provided without needing to read the memory unit. When the loop terminates via path 422, the address is returned 420 corresponding to coordinate $a_K$.

Figure 5:
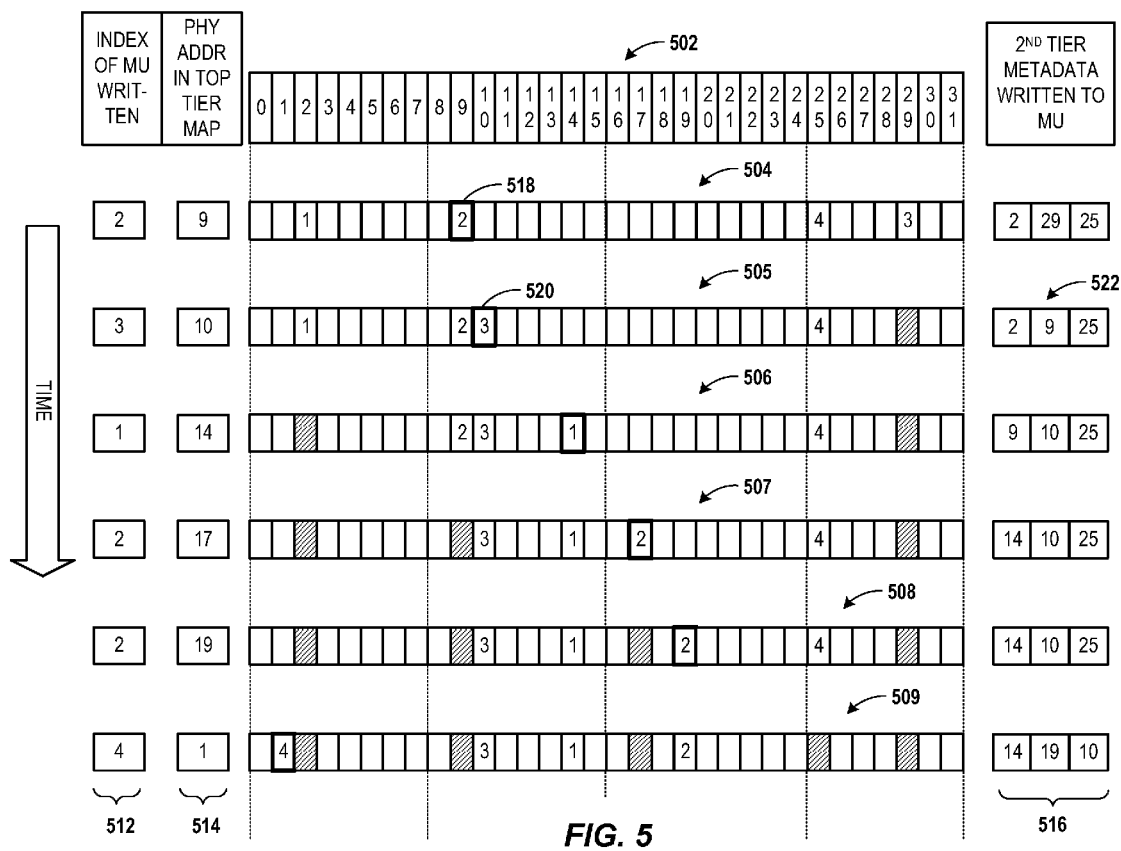
FIG. 5 is a block diagram illustrating an example of mapping data being written to a second tier map according to an example embodiment of the invention.

In order to provide a better understanding of the concepts related to multi-tiered mapping, a number of examples follow using two-tiered mapping examples (K=2). It will be appreciated that these examples may be applicable to implementations with K>2, e.g., by applying the subroutine shown in FIG. 4B. In FIG. 5, a block diagram illustrates an example of mapping data being written to a second tier map according to an example embodiment of the invention. Row 502 represents a range of physical addresses may be updated with each write.

For this example, it may be assumed for purposes of clarity that the address range 502 is contiguous and dedicated to a single set of mapping units with N=4. However, it should be appreciated that the concepts described in regards to FIG. 5 are equally applicable to non-continuous ranges, and physical addresses and/or address ranges need not be linked/dedicated to a particular logical addresses or address ranges.

Each of rows 504-509 represent a snapshot of the memory associated with physical address space 502 at a particular time/state. For purposes of this discussion, each of the cells in the rows 504-509 may be considered to represent the smallest individually addressable unit within the containing device (e.g., page). However, these concepts may be equally applicable to other memory unit sizes both smaller and larger then a memory page (e.g., blocks, segments, words, etc.). Also, only writes to single cells within the rows 504-509 are shown in this example, although embodiments of the invention are not limited to only single-unit writing.

Columns 512 and 514 on the left hand side of FIG. 5 contain data that may be stored in and/or used by a top tier map for each write action in rows 504-509. Column 512 contains an index to one of four mapping units that is targeted for writing for each of rows 504-509. This example uses an N=4 second tier, so these indices 512 are numbered by way of example from 1 to 4. These indices 512 may be arbitrarily assigned, or may be based in whole or in part on a logical block address (e.g., four least significant bits of a logical block address). Column 514 contains the address of the last unit written for each row. For example, when data is written to an index in column 512, the address pointed to in the previous row of column 514 is first read to determine the final physical address for that index, and then column 514 is updated with a newly assigned address after the write completes.

On the right hand side of FIG. 5 is a column 516 that indicates metadata included in the last written memory unit in each row 504-509. This metadata 516 includes three physical addresses corresponding to three of the four indices that may be referenced in column 512. For example, it may be possible that the system/apparatus knows the index of the targeted mapping unit, e.g., the index of the targeted unit in 512 may be included in the top-tier map along with address data in 514. In such a case, only the N−1 addresses 516 of the other members of the group need be written to the mapping unit. The stored addresses 516 can be ordered from smallest to largest index, excluding the index of the last written mapping unit storing the addresses, e.g., the mapping unit referenced in column 514. Other orderings may also be possible, e.g., largest to smallest index.

For example, in row 504, last written mapping unit 518 with index 2 resides at physical address 9 as indicated by data in columns 512 and 514 corresponding to row 504. The mapping metadata in column 516 corresponding to row 504 is stored in mapping unit 518, and this metadata 516 may at least include addresses of indices 1, 3, and 4, in that order. As seen by the dark border surrounding unit 518, this is the last memory unit to have been written, and so the physical address of memory unit 518 is shown in column 514 but not in the metadata 516.

When the memory is in a state corresponding to row 504, a subsequent write is targeted to index 3, resulting in the state shown in row 505. In order to perform this write, the mapping data shown in column 516 corresponding to the previous row 504, is accessed to find the physical address of the targeted index. The mapping data 516 shows that index 3 resides at physical address 29. Because the storage media includes flash memory or the like, the new data is not directly overwritten to this address, but a new, empty memory unit is selected to receive the data. The new memory unit chosen to receive the data corresponds cell physical address 10, and is indicated in the drawing as memory unit 520 in row 505.

When the data is written to the new mapping unit 520, the metadata 522 in column 516, which includes at least the addresses of indices 1, 2, and 4, is also written to the mapping unit 520. Accordingly, the top level map data in columns 512 and 514 may then be updated with the respective index and physical address. The index data in column 512 is already known because index 3 was targeted for writing. However the top-tier map may not be updated with this index (or the new physical address) until the write completes, so that the previous mapping data will be retained in the event of a write failure. In other embodiments, the index data 512 may not be stored at all with the top tier map, and need not be updated. For example, the index may be derived from a bitmask of the logical address of the targeted memory, and can thereby be dynamically determined at the time the memory access request is received.

It should be noted that, in rows 505-509, the mapping unit at address 29 (formerly index 3 in row 504) is shaded to indicate that the memory unit is stale/invalid. At a later time, garbage collection may be invoked to make this memory unit available for programming. In such an event, some or all of the valid data in addresses 502 may be copied elsewhere, and some or all of memory at addresses 502 may be erased for later reuse. In such a case, the metadata in columns 514 and 516 may be changed appropriately to reflect to the new addresses, and these updates are then written to the respective top-tier map and memory units. Additional considerations regarding the garbage collection of multi-tiered mapping storage units is discussed further hereinbelow.

It should be appreciated that memory in any of the rows/states seen in FIG. 5 can be read using a similar procedure to writing, except no writing need occur and no metadata needs to be updated. In reference now to FIG. 6, a flowchart illustrates a more detailed procedure 600 for reading a two-tier map according to an embodiment of the invention. A top tier mapping unit (MU) corresponding to the logical address being read is determined 602. For example, a lookup using a logical address may return a physical address, and this physical address need not be unique to the logical address (e.g., may be associated with a contiguous or arbitrary group of logical addresses). The index or other lower-tier identifier is also determined 604. The lookup 602 for the top tier MU may also return the index/identifier, and/or the index/identifier may be obtained directly from data in the logical address itself.

The forward map is read 606 to determine the physical address $A_{LAST}$ of the latest MU written. It will be appreciated that reading 606 of the forward map may be performed in conjunction with determining 602 the top-mapping unit, e.g., the output of 602 may include the address $A_{LAST}$. If it is determined 608 that the latest MU written has the same index as the desired MU, the target physical address $A_{TARGET}$ is set 610 to the address $A_{LAST}$ of the latest MU written, and this address can then be read 612. Otherwise, the physical address is read 614 to get the second tier map, which contains the physical address of all other top tier MU members, including the desired one.

In the illustrated two-tier examples, for random input/output (I/O) operations with size of one memory unit, the probability of requiring a flash read is (N−1)/N. On the other extreme, very large sequential I/Os may only require a single flash read to determine the physical address of all the memory units in any top tier group. In such a case, the probability of requiring a flash read on a per-request basis is at or near 1, because at least one other physical address may need to be read from the second tier metadata to perform the read. However, the ratio of reads on a per-mapping-unit basis approaches 1/N, e.g., only one read of the metadata is needed per N mapping units read. Further, this may represent little or no overhead in terms of read operations compared to a situation where the entire forward map is maintained in RAM. It is likely that, for a large sequential read, the top-tier mapping unit of a group would be read anyway, whether the mapping unit contains any mapping metadata or not.

Figure 6:
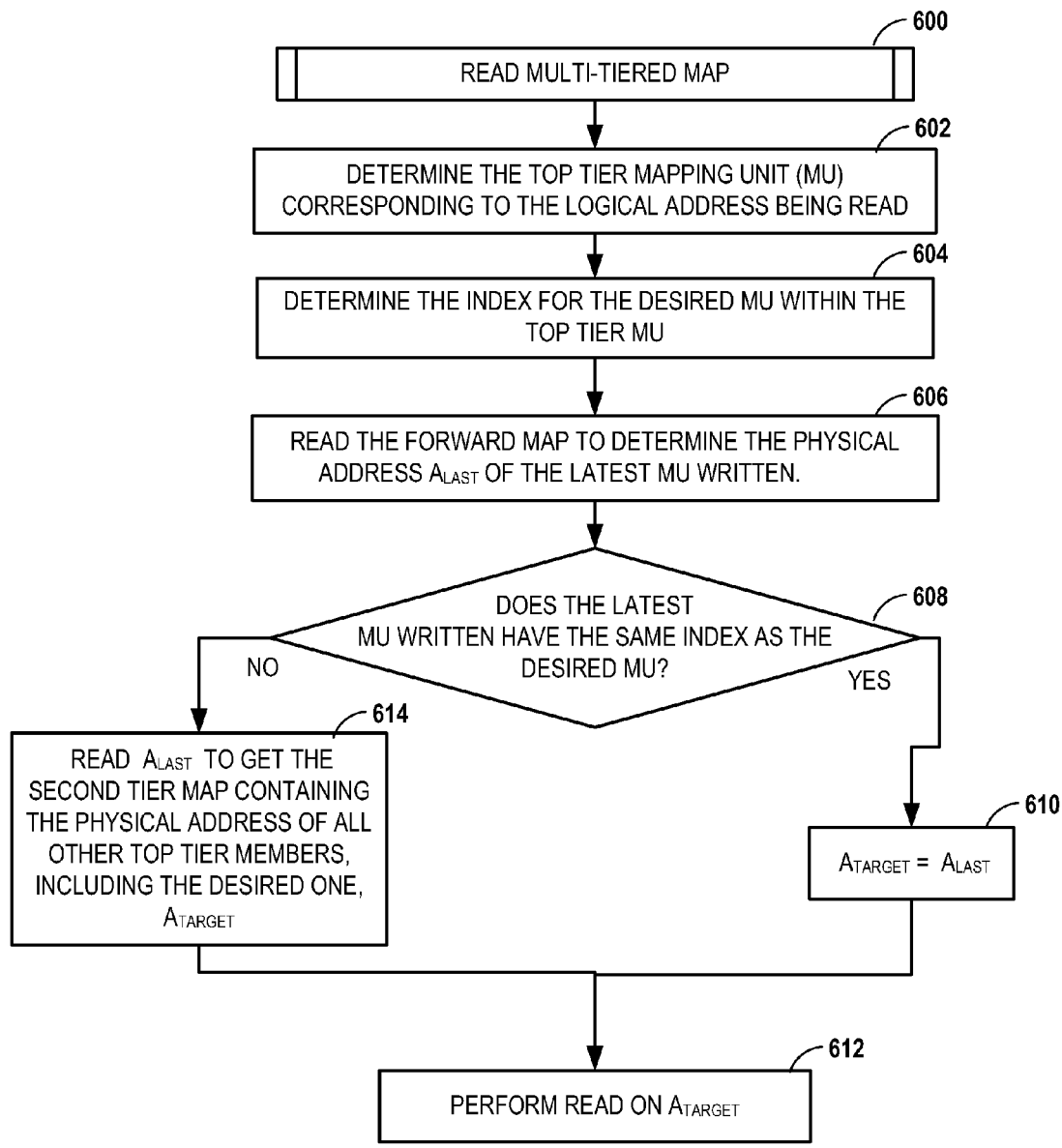
FIG. 6 is a flowchart illustrating reading data using a multi-tier map according to an example embodiment of the invention.
Figure 7:
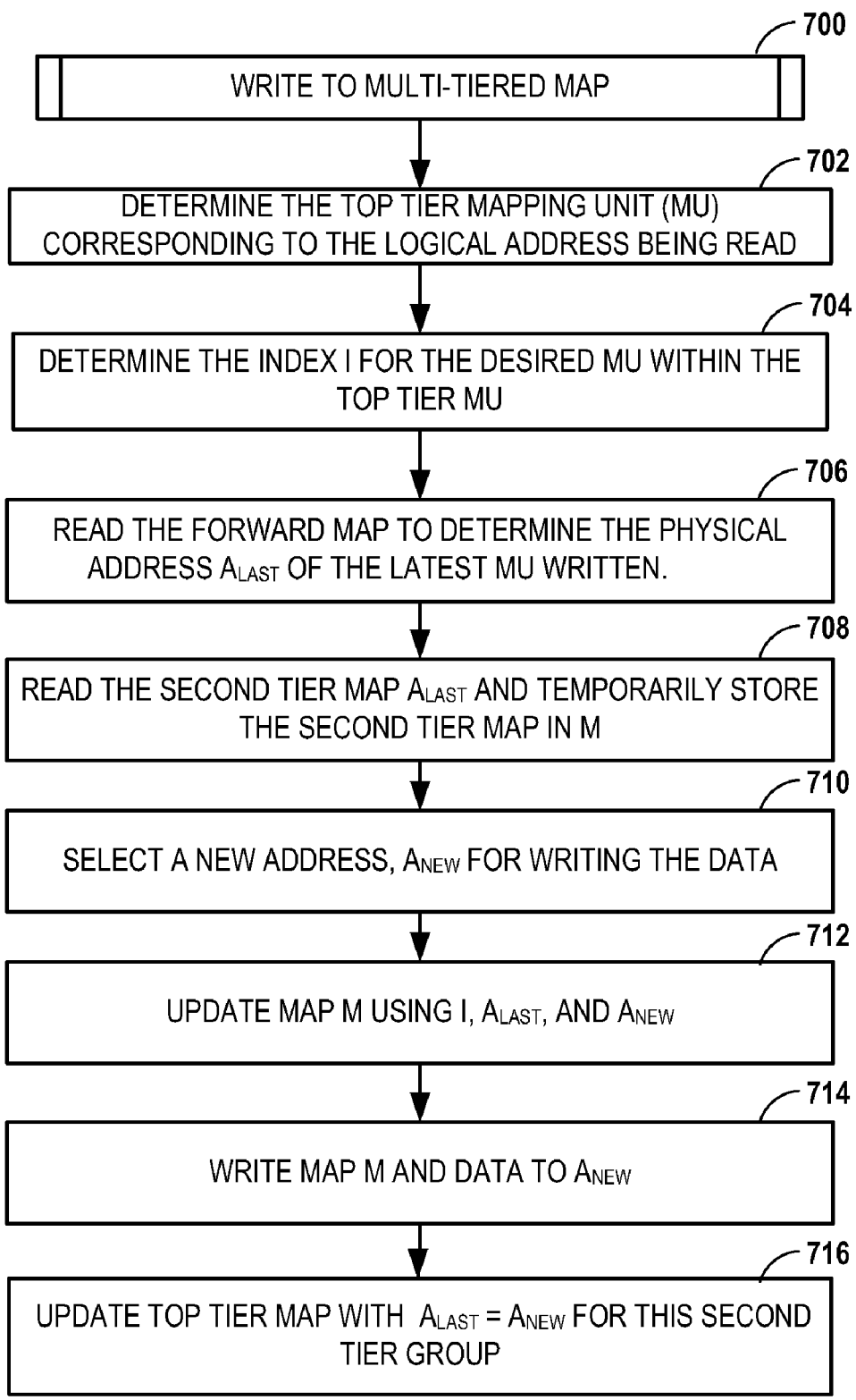
FIG. 7 is a flowchart illustrating writing data using a multi-tier map according to an example embodiment of the invention.

In reference now to FIG. 7, flowchart shows an example writing procedure 700 according to an embodiment of the invention. As with the read procedure 600 in FIG. 6, this may involve determining 702 the top tier MU corresponding to the logical address being written, determining 704 the index for the desired MU within the top tier MU, and reading 706 the forward map to determine the physical address $A_{LAST}$ of the latest MU written. This location $A_{LAST}$ contains the latest second tier map, which needs to be updated to reflect the new location being written.

Accordingly, the second tier map is read 708 and stored for later use. A new address $A_{NEW}$ is selected 710 for writing the new data. This new address $A_{NEW}$, as well as the old address $A_{LAST}$ and current index, can be used to update 712 the address map accordingly. The updated map and new/updated user data are written 714 to $A_{NEW}$, and the top tier map is also updated 716 to reflect the new top tier mapping unit. For random I/Os with size of one memory unit, the probability of requiring a flash read is 1, because the map needs to be updated regardless of which memory unit is targeted. For very large sequential I/Os, the new data is written to all the MUs in the group and so the old second tier map may not be needed. In such a case, the probability of requiring a flash read approaches zero.

As previously mentioned, additional flash reads needed to determine the lower tier addresses described in FIGS. 6 and 7 may impact performance if such reads are required during high utilization of the storage device. These performance impacts can be mitigated by having some or all of the map in a RAM cache. Caching can be particularly effective with this mapping approach because a single read of the second tier mapping in flash contains the mapping for all group members. Even a small amount of cache would benefit sequential workloads even with a very large number of streams.

With non-uniform workloads it may make sense to cache mapping data differently depending on whether the data is "cold" or "hot." The term "hot" data generally refers data that has been recently experienced a high frequency of write access. Data that has not been changed frequently and/or recently is referred to as "cold" data. Additional indicators/levels of activity may also be defined, e.g., "warm." A controller may cache the full map (e.g., all N-tiers of mapping data) hot data, and only cache the top tier map for the cooler data. Consider a two-tier example with N=8 and 20% hot data. The RAM requirements would be: 20%*0.1%+ 80%*0.1%/8=0.03% of total nonvolatile capacity. This is a significantly lower amount of RAM than the 0.1% needed for caching a full map.

Figure 8:
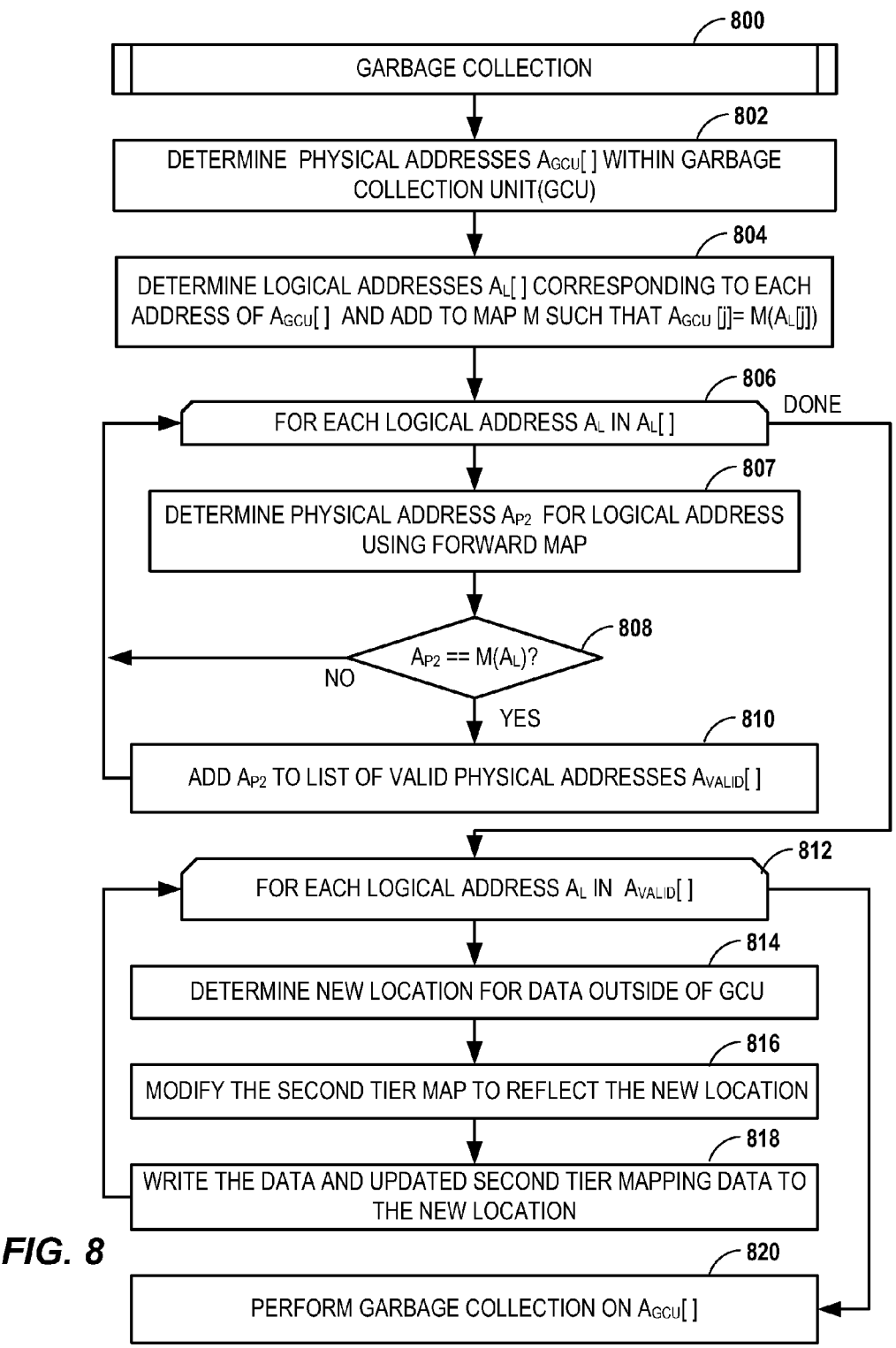
FIG. 8 is a flowchart illustrating a garbage collection procedure data using a multi-tier map according to an example embodiment of the invention.

As discussed in relation to FIG. 5, writing of data to flash memory may ultimately involve a garbage collection operation to erase blocks of data currently marked as invalid/stale and return those blocks for reuse by the storage device. In reference now to FIG. 8, a flowchart illustrates a procedure 800 for garbage collection according to an example embodiment of the invention. Because of how flash memory is erased (e.g., by applying a relatively large reverse voltage on the memory cells) the erasure of the units is often performed on garbage collection units (GCUs), which are collections of multiple pages or other addressable memory units.

This procedure 800 may first involve determining 802 every physical memory address $A_{GCU}$ in the GCU, and then determine 804 the corresponding logical address $A_L$ for each physical address. Square brackets are used to indicate that, e.g., $A_{GCU}$[ ] is a collection of addresses. This annotation is used in some programming languages to indicate a particular collection, e.g., an array, although the present example need not be limited to arrays.

As part of this determination 804, a temporary map be used to determine the physical addresses $A_{GCU}$[ ] based on the logical addresses $A_L$[ ]. This determination 804 may involve determining the logical address of a unit of data by directly reading that data. It will be appreciated that the data in the addresses $A_{GCU}$[ ] may be stale, and so the forward map may need to be read for each logical address found $A_L$[ ] in order to determine if the data is valid.

This reading of the forward map may involve an iteration 806 for each logical address found. In this iteration, the physical address corresponding to the logical address is determined 807. This determination may involve determining the corresponding top tier mapping unit and index for the logical address. Then forward map and second tier map are accessed to locate the physical address, $A_{P2}$. If the physical address $A_{P2}$ determined from the forward map is equal to the physical address read at step 804 (here shown in block 808 as a lookup to the map M using the current logical address as the key) then $A_{P2}$ is valid and added 810 to a list/collection of valid addresses.

Upon termination of loop 806, each of the valid addresses is iterated through 810. In this iteration, a new memory location outside the current GCU is determined 814. The second tier mapping is modified 816 to reflect the new location of the recycled day and write this updated second tier mapping with the data. The data with modified mapping information is then written 818 to the new location. Once all valid addresses have been considered, loop 812 exits and garbage collection can commence 820 on the GCU.

The garbage collection procedure 800 reflects somewhat of a brute-force approach. While relatively straightforward to implement, it may require too much overhead in terms of flash reads and/or computation for some purposes. One alternative to this type of procedure is to maintain a directory of all the memory units stored in each GCU. This directory can be maintained in the controller while the GCU is being filled and then written to flash when full. The directory may not identify mapping units that are stale because of subsequent writes. One way to identify the stale mapping units in such a case is to have a validity map for all directory entries in each GCU. This can be kept in RAM, and can be volatile, since the validity information can be determined from the forward map with some additional delay, e.g., using the procedure 800. The validity map for all GCUs may be kept very compact, e.g., requiring only 1 bit for each mapping unit.

A GCU directory may also be useful for rebuilding the top tier map after a power loss. The time to rebuild may be limited by the RAM writing time rather than the flash reading time. The RAM writing time may be reduced significantly by consolidating all of the directory entries for the same top tier group within each GCU. By including the mapping information with the data, it is protected by the outer code and can be recovered in the event of a die failure. In another embodiment, a timestamp may be used to identify the latest second tier map in each group. In such a case, a GCU directory could still be included as an additional redundancy. It may contain similar information as the time stamps, but in another format.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
grouping a user data portion of a flash memory arrangement into a plurality of mapping units, wherein each of the mapping units comprises a user data memory portion and a metadata portion;
forming the mapping units into a plurality of groups, wherein the groups are associated with at least one lower tier of a forward memory map;
for each of the groups, determining a last written mapping unit within the group, wherein the last written mapping unit includes mapping data in the metadata portion that facilitates determining a physical address of other mapping units within the group;
forming a top tier of the forward memory map that includes at least physical memory locations of the last written mapping units of each of the groups; and
determining a physical address of a targeted memory using the top tier and the metadata of the at least one lower tier.

2. The method of claim 1, where the physical addresses of the mapping units are arbitrarily assigned to corresponding logical addresses used by a host to access the user data memory portions of the mapping units.

3. The method of claim 1, where determining a physical address of the targeted memory using the top tier and the metadata of the at least one lower tier comprises:
selecting a first last written memory unit from a selected one of groups based on a logical address of the targeted memory;
determining the physical address of the targeted memory based on the metadata portion of the first last written memory unit.

4. The method of claim 1, wherein the at least one lower tier comprises a second tier and a third tier, and wherein the groups are associated with the second tier.

5. The method of claim 4, wherein each of the groups comprise a plurality of subgroups, and wherein the subgroups are associated with the third tier.

6. The method of claim 5, where determining the physical address of the targeted memory using the top tier and the metadata of the at least one lower tier comprises:
selecting a first last written memory unit from a selected one of groups based on a logical address of the targeted memory;
determining a second last written memory unit of a selected one of the subgroups based on the metadata portion of the first last written memory unit; and
determining the physical address of the targeted memory based on the metadata portion of the second last written memory unit.

7. The method of claim 1, wherein the mapping data of the last written mapping units do not include the physical addresses of the respective last written mapping units.

8. An apparatus, comprising:
a user data portion of a flash memory arrangement grouped into a plurality of mapping units, wherein each of the mapping units comprises a user data memory portion and a metadata portion; and
a controller configured to provide access to the user data portion of the flash memory based on logical addresses, the controller configured with instructions that cause the apparatus to:
form the mapping units into a plurality of groups, wherein the groups are associated with at least one lower tier of a forward memory map;
for each of the groups, determine a last written mapping unit within the group, wherein the last written mapping unit includes mapping data in the metadata portion that facilitates determining a physical address of other mapping units within the group;
form a top tier of the forward memory map that includes at least physical memory locations of the last written mapping units of each of the groups; and
determine a physical address of a targeted memory using the top tier and the metadata of the at least one lower tier.

9. The apparatus of claim 8, where the physical addresses of the mapping units are arbitrarily assigned to corresponding logical addresses used by a host to access the user data memory portions of the mapping units.

10. The apparatus of claim 8, where determining a physical address of the targeted memory using the top tier and the metadata of the at least one lower tier comprises:
selecting a first last written memory unit from a selected one of groups based on a logical address of the targeted memory;
determining the physical address of the targeted memory based on the metadata portion of the first last written memory unit.

11. The apparatus of claim 8, wherein the at least one lower tier comprises a second tier and a third tier, and wherein the groups are associated with the second tier.

12. The apparatus of claim 11, wherein each of the groups comprise a plurality of subgroups, and wherein the subgroups are associated with the third tier.

13. The apparatus of claim 12, where determining the physical address of the targeted memory using the top tier and the metadata of the at least one lower tier comprises:
selecting a first last written memory unit from a selected one of groups based on a logical address of the targeted memory;
determining a second last written memory unit of a selected one of the subgroups based on the metadata portion of the first last written memory unit; and
determining the physical address of the targeted memory based on the metadata portion of the second last written memory unit.

14. The apparatus of claim 8, wherein the mapping data of the last written mapping units do not include the physical addresses of the respective last written mapping units.

15. A method comprising:
receiving, at a flash memory device, an access request for user data based a logical memory address;
determining, from a top tier of a forward map based on the logical memory address, a physical address of a last written mapping unit of a lower tier group of the forward map, wherein the lower tier group comprises a plurality of mapping units, including the last written mapping unit, and wherein the mapping units each comprise a user data memory portion and a metadata portion;
determining, from lower tier mapping data within the metadata portion of the last written mapping unit, a second physical address of a mapping unit of the lower tier group; and facilitating access to the user data based on the second physical address.

16. The method of claim 15, wherein the physical addresses of the mapping units are arbitrarily assigned to the corresponding logical addresses.

17. The method of claim 15, wherein the access request comprises a write request, the method further comprising:
- selecting an new mapping unit of the lower tier group for receiving user data of the write request;
- updating the lower tier mapping data based on a physical address of the new mapping unit;
- writing the user data and the mapping data to the respective user data memory portion and metadata portion of the new mapping unit; and
- updating the top tier with a physical address of the new mapping unit.

18. The method of claim 15, wherein the determining of the second physical address from the lower tier mapping data of the last written mapping unit only occurs if the last written mapping unit does not correspond to the logical memory address, and if the last written mapping unit corresponds to the logical memory address, providing physical address of the last written mapping unit as the second physical address to facilitate access to the user data.

19. The method of claim 15, wherein the lower tier mapping data comprises second tier mapping data, and wherein facilitating access to the user data based on the second physical address comprises:
- determining, from the second tier mapping data, a physical address of a second last written mapping unit of a third tier group of the forward map, wherein the third tier group comprises a subset of the lower tier group;
- determining, from third tier mapping data within the metadata portion of the second last written mapping unit, a third physical address of a mapping unit of the third tier group; and
- facilitating access to the user data based on the third physical address.

20. An apparatus, comprising a user data portion of a flash memory arrangement and a controller configured with instructions that cause the apparatus to perform the operations set forth in the method of claim 15, wherein the user data portion of the flash memory comprises the plurality of mapping units.

\* \* \* \* \*